US011358274B2

(12) United States Patent
Yaozhang

(10) Patent No.: US 11,358,274 B2
(45) Date of Patent: *Jun. 14, 2022

(54) AUTONOMOUS MOBILE ROBOT WITH ADJUSTABLE DISPLAY SCREEN

(71) Applicant: LINGDONG TECHNOLOGY (BEIJING) CO. LTD, Beijing (CN)

(72) Inventor: Herrickhui Yaozhang, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 382 days.

This patent is subject to a terminal disclaimer.

(21) Appl. No.: 16/470,511

(22) PCT Filed: Jun. 13, 2019

(86) PCT No.: PCT/CN2019/091062
§ 371 (c)(1),
(2) Date: Jun. 17, 2019

(87) PCT Pub. No.: WO2020/248185
PCT Pub. Date: Dec. 17, 2020

(65) Prior Publication Data
US 2021/0339382 A1  Nov. 4, 2021

(51) Int. Cl.
*H04W 4/80* (2018.01)
*B25J 9/00* (2006.01)
(Continued)

(52) U.S. Cl.
CPC ............. *B25J 9/0009* (2013.01); *B25J 5/007* (2013.01); *B25J 13/086* (2013.01); *B25J 13/089* (2013.01); *B25J 19/023* (2013.01); *H04W 4/80* (2018.02)

(58) Field of Classification Search
CPC ...... B25J 9/0009; B25J 5/0007; B25J 13/086; B25J 13/089; B25J 19/023; B25J 9/1676;
(Continued)

(56) References Cited

U.S. PATENT DOCUMENTS 11,255,663 B2 *  2/2022  Binder .................. G01S 17/08
2016/0129593 A1 *  5/2016  Wolowelsky .......... B25J 9/1666
700/253
(Continued)

FOREIGN PATENT DOCUMENTS

CN      207643136 U    7/2018
CN      109015593 A   12/2018
(Continued)

OTHER PUBLICATIONS

Yelamarthi et al., An RFID based autonomous indoor tour guide robot, 2012, IEEE, p. 562-565 (Year: 2012).*
(Continued)

*Primary Examiner* — McDieunel Marc
(74) *Attorney, Agent, or Firm* — NZ Carr Law Office PLLC

(57) ABSTRACT

An autonomous mobile robot comprising a body and a display screen coupled to the body and configured to display information. A wheel control system is coupled to the body and configured to move the body in a given direction. At least one of a camera, an onboard UWB device, or a sensor is coupled to the body. A central processing unit is in communication with the wheel control system, the display screen, and the at least one camera, onboard UWB device, or sensor. The central processing unit is configured to adjust the orientation of the display screen relative to a user based on information received from the at least one camera, onboard UWB device, or sensor.

19 Claims, 14 Drawing Sheets

(51) Int. Cl.
*B25J 5/00* (2006.01)
*B25J 13/08* (2006.01)
*B25J 19/02* (2006.01)

(58) Field of Classification Search
CPC ....... B25J 9/1697; H04W 4/80; B64C 39/024; B64C 2201/12; B64C 39/022; F03D 15/10; F03D 7/06
See application file for complete search history.

(56) References Cited

U.S. PATENT DOCUMENTS

| | | | | |
|---|---|---|---|---|
| 2018/0055326 | A1* | 3/2018 | Jung | A47L 9/2805 |
| 2019/0212730 | A1* | 7/2019 | Jones | G05D 1/028 |
| 2019/0339715 | A1* | 11/2019 | Kwak | G05D 1/028 |
| 2020/0088524 | A1* | 3/2020 | Shin | B25J 9/16 |
| 2020/0393846 | A1* | 12/2020 | Tang | A45C 13/28 |
| 2021/0165421 | A1* | 6/2021 | Ko | G05D 1/028 |
| 2021/0173407 | A1* | 6/2021 | Tang | G06K 9/209 |
| 2021/0232151 | A1* | 7/2021 | Liu | G06T 7/20 |
| 2021/0402898 | A1* | 12/2021 | Alvarez | B60N 2/002 |

FOREIGN PATENT DOCUMENTS

| | | |
|---|---|---|
| CN | 208196812 U | 12/2018 |
| CN | 208262848 U | 12/2018 |
| CN | 208930273 U | 6/2019 |
| JP | 2016196073 A | 11/2016 |

OTHER PUBLICATIONS

Gugliermetti et al., Air quality monitoring by means of a miniaturized sensor onboard an autonomous wheeled rover, 2016, IEEE, p. 1-4 (Year: 2016).*

Arif et al., Adaptation of mobile robots to intelligent vehicles, 2013, IEEE, p. 550-553 (Year: 2013).*

Lin et al., Virtual reality head-tracking observation system for mobile robot, 2014, IEEE, p. 152-157 (Year: 2014).*

International Search Report and Written Opinion for PCT/CN2019/091062 dated Mar. 12, 2020 by WIPO.

* cited by examiner

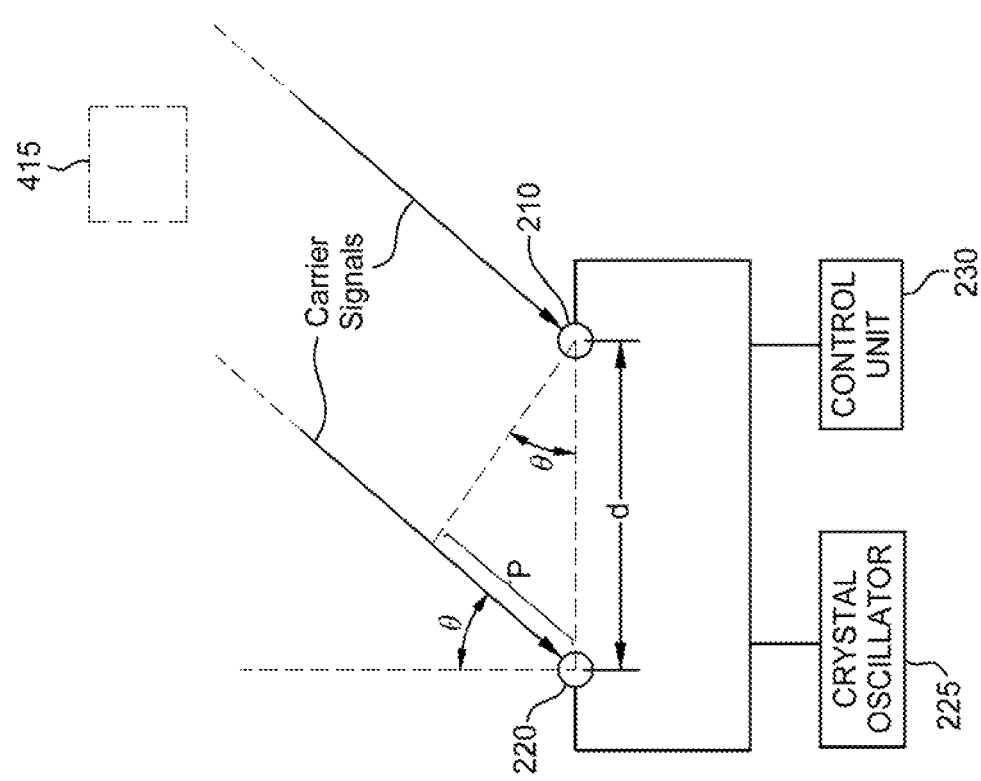

Equation 1: $P = d \sin \theta$ $\lambda$ = wavelength of the carrier signal
$f$ = carrier frequency
$c$ = speed of light Equation 2: $\lambda = \frac{c}{f}$ $\alpha$ = phase difference between carrier signals arriving at antennas 220, 210

Equation 3: $\frac{\alpha}{2\pi} = \frac{P}{\lambda}$

Equation 4: $P = \frac{\alpha \lambda}{2\pi}$

Equation 5: $\sin \theta = \frac{\alpha \lambda}{2\pi d}$ $\theta$ = angle of arrival Equation 6: $\theta = \sin^{-1} \frac{\alpha \lambda}{2\pi d}$

FIG. 3B

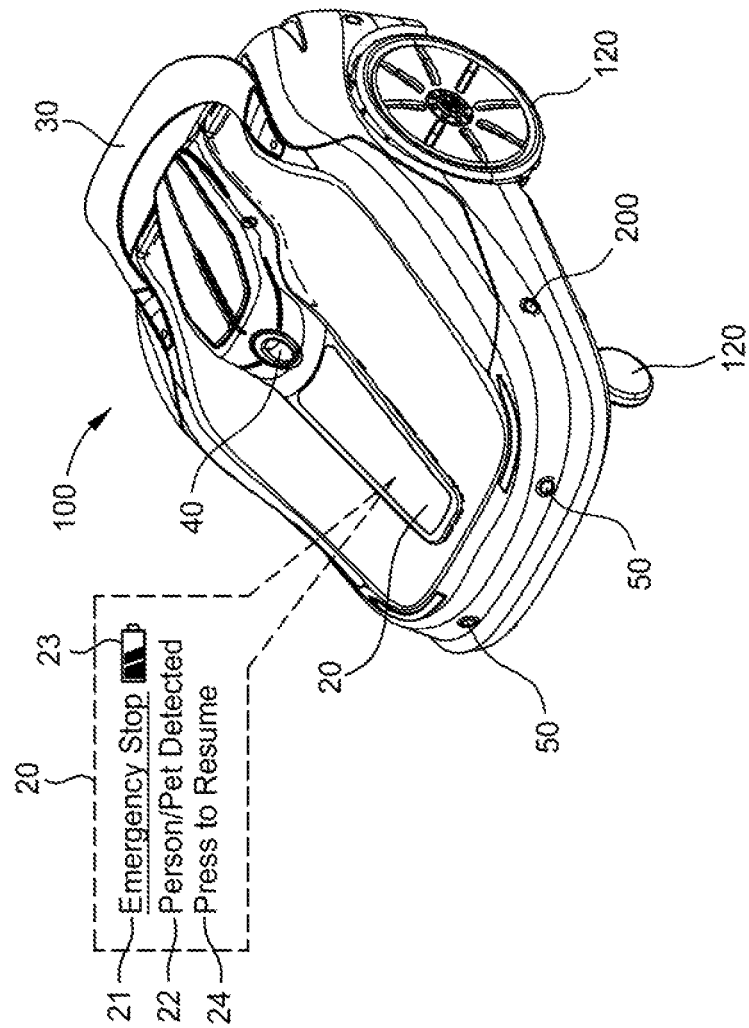
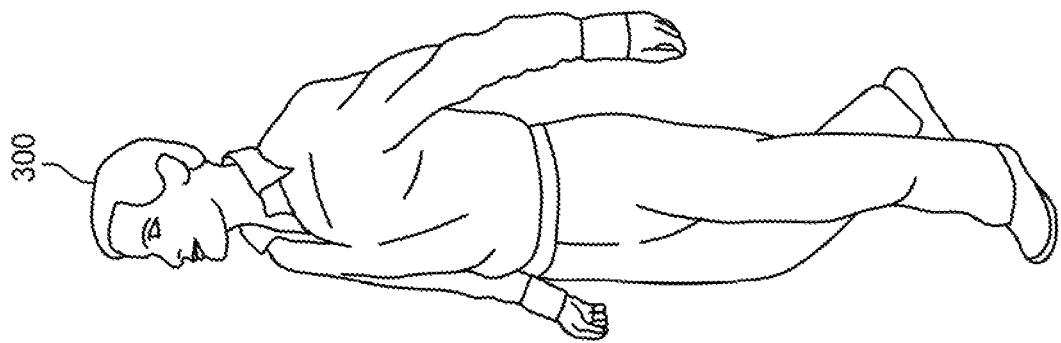
FIG. 7

AUTONOMOUS MOBILE ROBOT WITH ADJUSTABLE DISPLAY SCREEN

BACKGROUND

Field

Embodiments disclosed herein relate to an autonomous mobile robot having an adjustable display screen.

Description of the Related Art

The use of autonomous mobile robots continues to increase in multiple industries. From robot vacuum cleaners to self-following luggage, more and more autonomous mobile robots are used in our daily lives. As the autonomous mobile robot moves, it would be helpful for a user to be able to easily see a status indicator or other information regarding the operation of the autonomous mobile robot at all times. Therefore there is a continuous need for new and improved autonomous mobile robot systems.

SUMMARY

In one embodiment, an autonomous mobile robot comprises a body; a display screen coupled to the body and configured to display information; a wheel control system coupled to the body and configured to move the body in a given direction; at least one of a camera, an onboard UWB device, or a sensor coupled to the body; and a central processing unit in communication with the wheel control system, the display screen, and the at least one camera, onboard UWB device, or sensor, wherein the central processing unit is configured to adjust the orientation of the display screen relative to a user based on information received from the at least one camera, onboard UWB device, or sensor.

In one embodiment, an autonomous mobile robot comprises a body; a display screen coupled to the body and configured to display information; a wheel control system coupled to the body and configured to move the body in a given direction; and a central processing unit in communication with the wheel control system and the display screen, wherein the central processing unit is configured to adjust the orientation of the display screen relative to a user based on a recorded speed of the user when the autonomous mobile robot is obstructed from detecting the user.

In one embodiment, an autonomous mobile robot comprises a body; a display screen coupled to the body and configured to display information; a wheel control system coupled to the body and configured to move the body in a given direction; and a central processing unit in communication with the wheel control system and the display screen, wherein the central processing unit is configured to turn the display screen on or off, as well as adjust the orientation of the display screen when turned on, based on a proximity of a user relative to the body.

BRIEF DESCRIPTION OF THE DRAWINGS

FIG. 3B is a schematic view of an angle of arrival calculation method according to one embodiment.

FIG. 7 is a schematic view of an autonomous mobile robot in the form of a vacuum cleaner or a lawn mower according to one embodiment.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include autonomous mobile robots that are self-driving and have one or more motorized wheel assemblies. The autonomous mobile robots are configured to autonomously follow any type of target, such as a user, moving in a given direction. Although the embodiments of the autonomous mobile robots are described and illustrated herein with respect to a luggage, a vacuum cleaner, a lawn mower, a shopping cart, and a logistic mobile robot, the embodiments may be used with other types of portable equipment.

Figure 1:
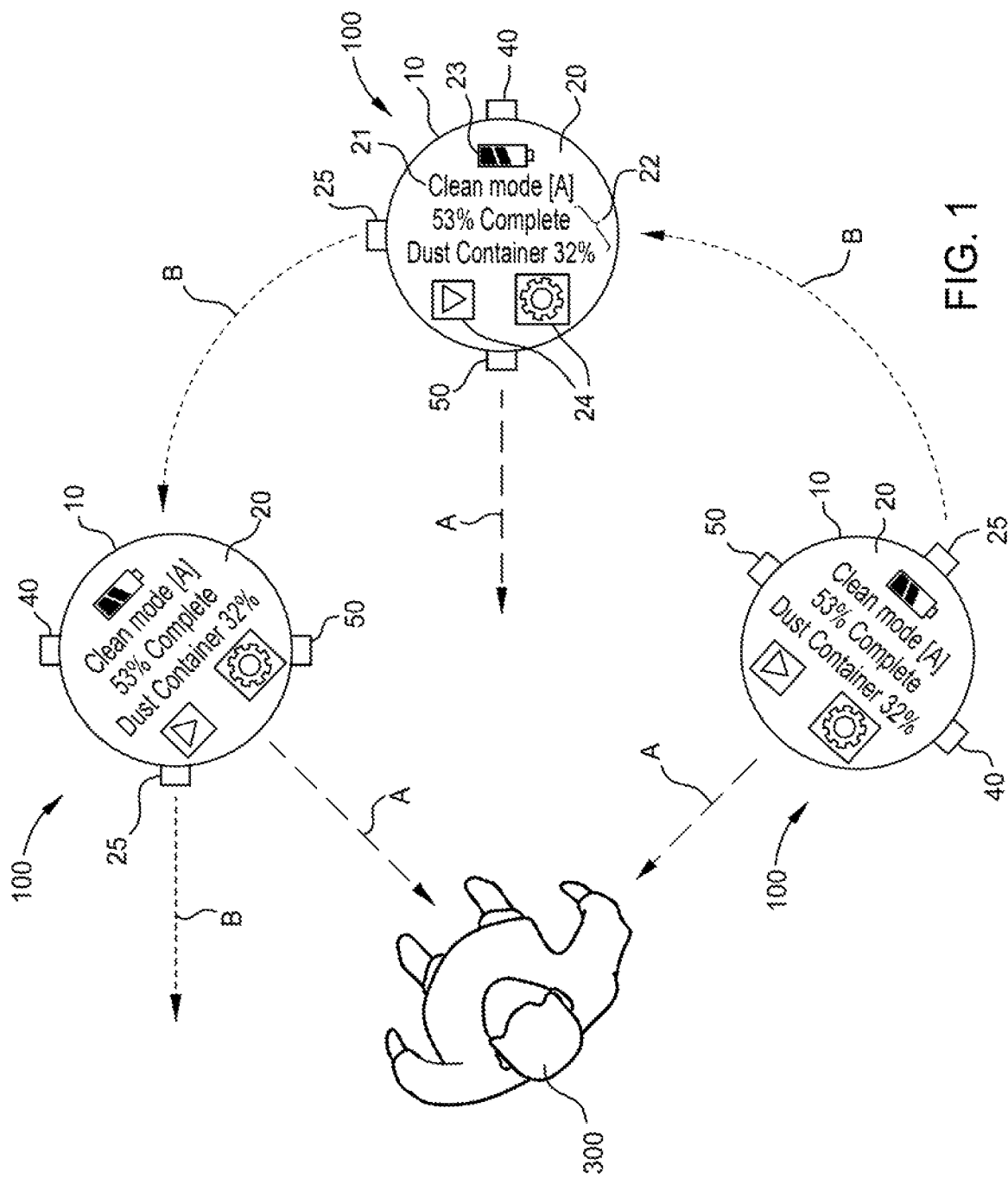
FIG. 1 is a schematic view of an autonomous mobile robot moving in a given direction relative to a user according to one embodiment.

FIG. 1 is a schematic view of an autonomous mobile robot 100 moving in a given direction relative to a user 300 according to one embodiment. The autonomous mobile robot 100 includes a body 10, a display screen 20, a front end 25, one or more cameras 40, and one or more sensors 50. In one embodiment, the autonomous mobile robot 100 may include only cameras 40. In one embodiment, the autonomous mobile robot 100 may include only sensors 50. In one embodiment, the autonomous mobile robot 100 may include a combination of cameras 40 and sensors 50.

As the autonomous mobile robot 100 moves in a given direction, identified by reference arrows B, the orientation of the display screen 20 is configured to automatically adjust into a viewing direction, identified by reference arrows A, that is directed towards (e.g. faces) the user 300. The viewing direction of the display screen 20 is always in line with the sight of the user 300 as the autonomous mobile robot 100 moves in the given direction. The viewing direction of the display screen 20 is always in line with the sight of the user 300 regardless of where the front end 25 of the autonomous mobile robot 100 is oriented or pointing. The viewing direction of the display screen 20 is independent of the given direction and/or the orientation of the front end 25 of the autonomous mobile robot 100.

As shown in FIG. 1, the autonomous mobile robot 100 is in the form of a vacuum cleaner that can be preprogrammed to move in a given direction to clean floors. The display screen 20 may display information, such as a mode of operation 21 (e.g. cleaning mode), a status of operation 22 (e.g. percent of floor clean and/or percent of vacuum container filled), a battery indicator 23 (e.g. percent of battery power remaining), and/or one or more buttons for operation 24 (e.g. a start/pause/stop button and/or a setting button). The cameras 40 and/or the sensors 50 of the autonomous mobile robot 100 detect where the user 300 is located relative to the autonomous mobile robot 100 position, and in response, the orientation of the display screen 20 is adjusted so that the viewing direction of the display screen 20 is oriented in the line of sight of the user 300. In this manner, the display screen 20 is always right side up relative to the user 300 for ease of viewing.

The one or more cameras 40 are coupled to the body 10 of the autonomous mobile robot 100. Any number of cameras 40 can be used and located at different positions and/or on any side of the body 10. The cameras 40 are configured to detect and record, such as take photographs and/or videos, of nearby targets. In one embodiment, cameras 40 are configured to detect the proximity (e.g. distance) of one or more targets, such as the user 300, relative to the autonomous mobile robot 100 to help determine the position of the target relative to the autonomous mobile robot 100.

The one or more sensors 50 are coupled to the body 10 of the autonomous mobile robot 100. Any number of sensors 50 can be used and located at different positions and/or on any side of the body 10. The sensors 50 are configured to detect the proximity (e.g. distance) of one or more targets, such as the user 300, relative to the autonomous mobile robot 100 to help determine the position of the target relative to the autonomous mobile robot 100. The sensors 50 may include but are not limited to ultrasonic sensors, sonar sensors, infrared sensors, radar sensors, and/or LiDAR sensors.

Autonomous Mobile Robot Using Camera Based System

Figure 2:
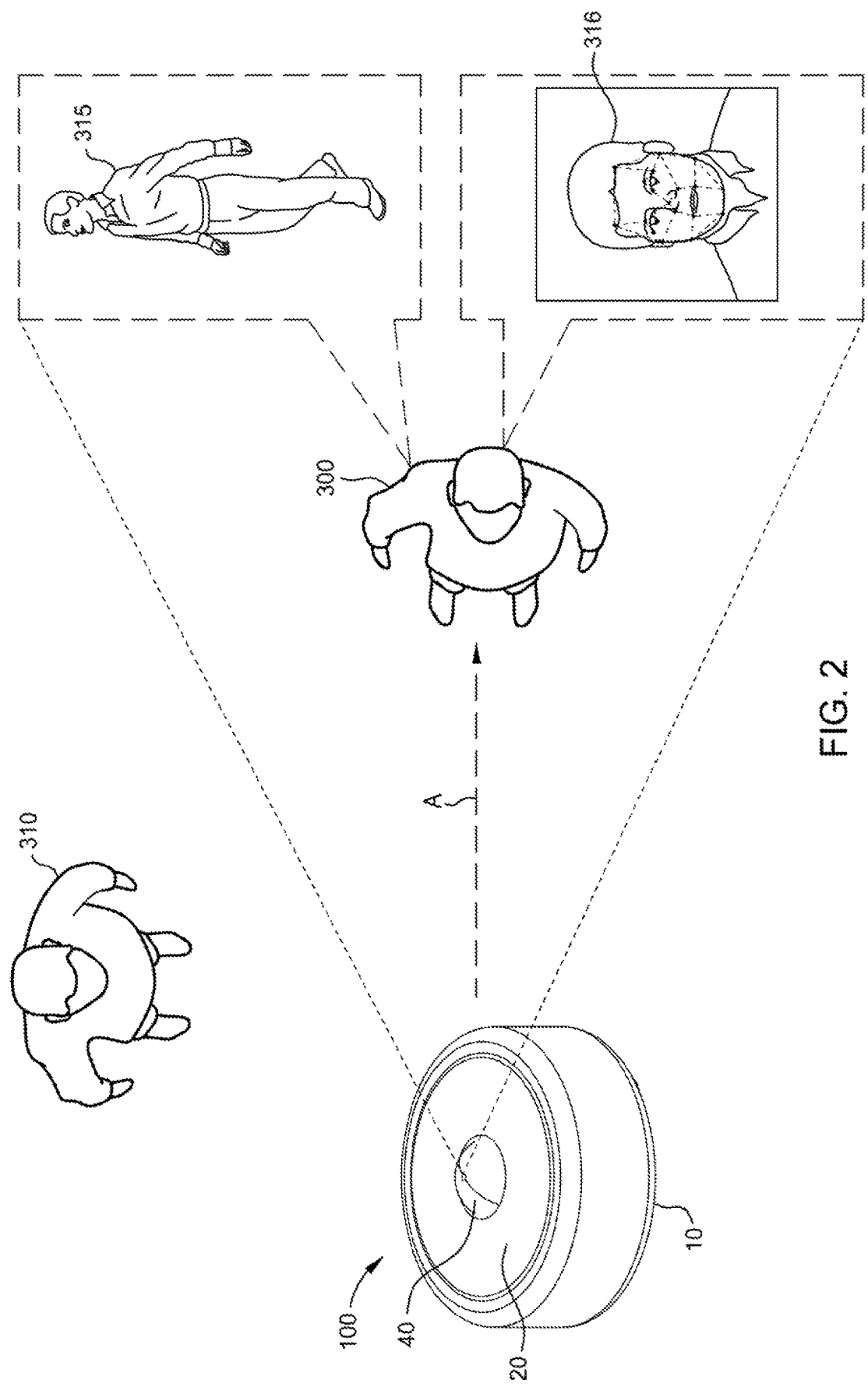
FIG. 2 is a schematic view of an autonomous mobile robot identifying a user according to one embodiment.

FIG. 2 is a schematic view of an autonomous mobile robot 100 identifying a user 300 according to one embodiment. The body 10 of the autonomous mobile robot 100 has a cylindrical shape. The display screen 20 is disposed on top of the body 10, surrounding the camera 40, which is positioned in the center of the body 10. The camera 40 is configured to detect and record nearby targets, such as the user 300 and other people 310. The camera 40 is configured to take photographs and/or videos of the nearby targets. Based on the photographs and/or videos, the autonomous mobile robot 100 is configured to identify the user 300, and then orient the display screen in the line of sight of the user 300. Specifically, the viewing direction, identified by reference arrow A, is in line with the sight of the user 300.

The user 300 may register their face 316 and/or their appearance 315 with the autonomous mobile robot 100 when using the autonomous mobile robot 100. The face 316 and/or the appearance 315 of the user 300 may include the skeletal structure and/or shape of the user's face and/or body. The face 316 and/or the appearance 315 of the user 300 may include the color and/or shape of the clothes that the user 300 is wearing. After registration, the autonomous mobile robot 100 will adjust the viewing direction of the display screen 20 when the registered face 316 and/or appearance 315 of the user 300 is detected. If only one person within the viewing range of the camera 40, the autonomous mobile robot 100 may be configured to orient the display screen 20 to that person, without identifying the target. People recognition only without identifying the target can possibly save energy and extend battery life of the autonomous mobile robot 100.

Autonomous Mobile Robot Using Ultra-Wideband Based System

Figure 3A:
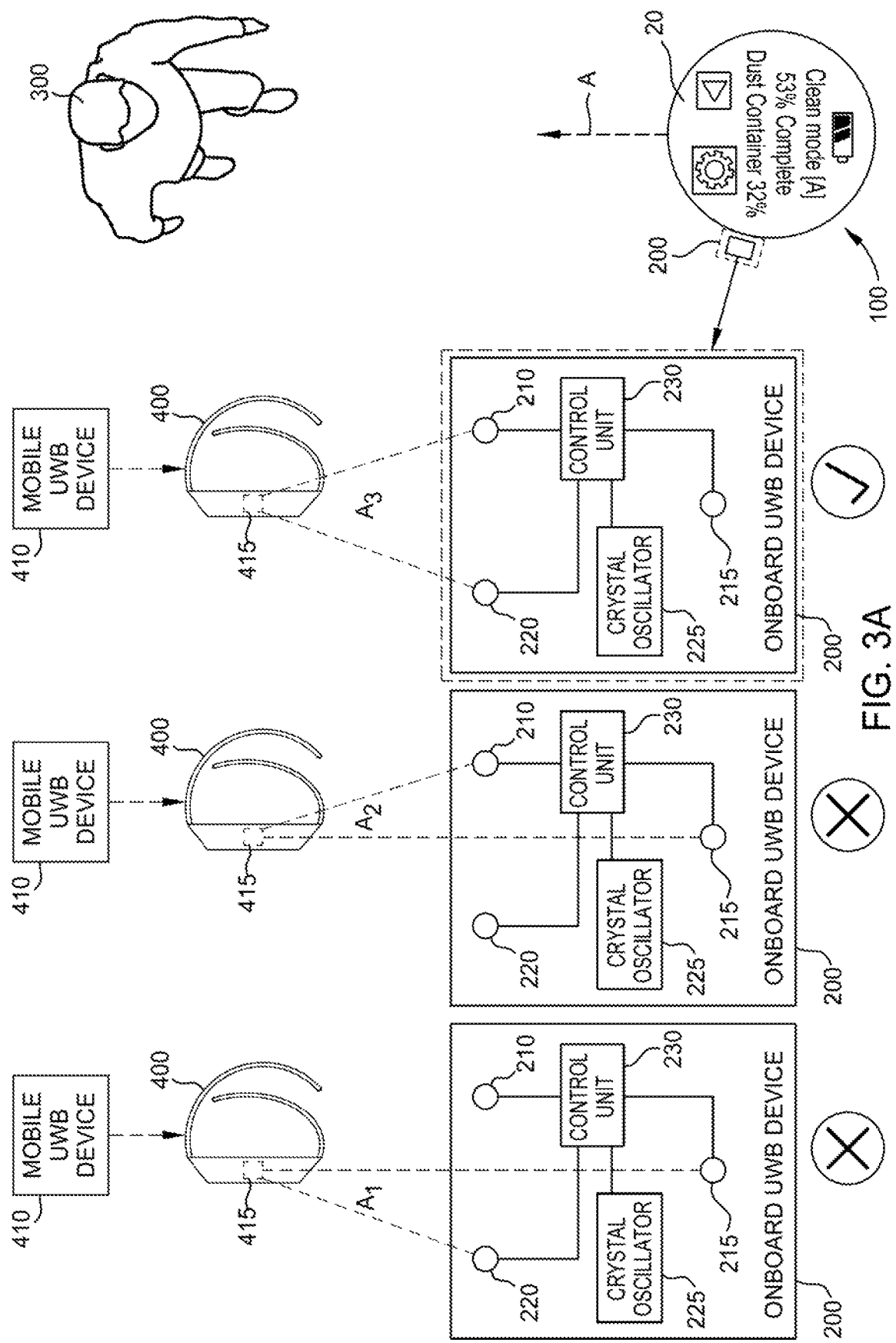
FIG. 3A is a schematic view of a personal user device communicating with an onboard ultra-wideband device of an autonomous mobile robot according to one embodiment.

FIG. 3A is a schematic view of a personal user device 400 communicating with an onboard ultra-wideband (UWB) device 200 of an autonomous mobile robot 100 according to one embodiment. The onboard UWB device 200 is coupled to the body 10 of the autonomous mobile robot 100. The onboard UWB device 200 has a positioning component that includes three wireless transceivers 210, 215, 220 (such as antennas), which are configured to receive one or more signals (such as a radio frequency wave) from the personal user device 400 having a mobile ultra-wideband (UWB) device 410. The signal is communicated by a transmitter 415 of the mobile UWB device 400 to the transceivers 210, 215, 220 identify the position of a target, such as the user 300, relative to the autonomous mobile robot 100.

It is understood that the mobile UWB device 410 and the transmitter 415 are integrated into the personal user device 400. The mobile UWB device 410 and the transmitter 415 may be in the form of hardware disposed within the personal user device 400 and/or software programmed into the personal user device 400. The personal user device 400 is shown as a wristband, but may also be a cellular phone, a tablet, a computer, and/or any other device that can be configured with the mobile UWB device 410 and the transmitter 415 to communicate with the onboard UWB device 200.

The combination of the onboard UWB device 200 and the mobile UWB device 410 forms a UWB based target tracking system configured to identify the position of the user 300 relative to the autonomous mobile robot 100 when the user 300 is wearing or is otherwise in possession of the personal user device 400. The target tracking system helps to keep the autonomous mobile robot 10 moving in a given direction relative to the user 300, while maintaining the viewing position of the display screen 20 of the autonomous mobile robot 100 oriented in line with the sight of the user 300 regardless of any changes in the surrounding environment's lighting conditions as further described below.

Ultra-wideband is a radio wave technology that uses low energy for short-range, high-bandwidth communications over a large portion of the radio spectrum, which includes frequencies within a range of 3 hertz to 3.000 gigahertz. The ultra-wideband based target tracking system of the autonomous mobile robot 100 uses a combination of an angle of arrival mechanism and a time difference of arrival mechanism to help determine the position of the user 300 relative to the body 10.

The angle of arrival mechanism is shown in FIGS. 3A and 3B. The angle of arrival mechanism is a method for determining the largest angle between each pair of transceivers 210, 215, 220 relative to the transmitter 415 of the mobile UWB device 410, and then using that specific pair of transceivers to determine the position of the transmitter 415 relative to the onboard UWB device 200 of the autonomous mobile robot 100.

As shown in FIG. 3A, the transmitter 415 of the mobile UWB device 410 on the personal user device 400 wirelessly communicates a signal (such as a radio frequency wave) to the transceivers 210, 215, 220 of the onboard UWB device 200. Presumably the user 300 is wearing or is otherwise in possession of the personal user device 400 and therefore the position of the user 300 is being calculated. Specifically, a control unit 230 (such as a central processing unit) and a crystal oscillator 225 of the onboard UWB device 200 are configured to continuously calculate the angle at which the transmitter 415 is located relative to two of the transceivers 210, 215, 220 to determine the largest angle.

Position angle 1 is the angle at which the transmitter 415 is located relative to transceivers 215, 220 as calculated by the control unit 230 in conjunction with the crystal oscillator 225. Position angle 2 is the angle at which the transmitter 415 is located relative to transceivers 210, 215 as calculated by the control unit 230 in conjunction with the crystal oscillator 225. Position angle 3 is the angle at which the transmitter 415 is located relative to transceivers 210, 220 as calculated by the control unit 230 in conjunction with the crystal oscillator 225. The control unit 230 includes an algorithm configured to calculate the position angles A1, A2, A3 based on an angle of arrival calculation method as shown in FIG. 3B.

FIG. 3B shows one example of an angle of arrival calculation method for one pair of transceivers, specifically transceivers 210, 220, relative to the transmitter 415 of the mobile UWB device 410. As shown in FIG. 3B, the transceivers 210, 220 receive one or more carrier signals (such as a radio frequency wave) from the transmitter 415. The crystal oscillator 225 provides clock information which helps define the wavelength of the carrier signal (A) and the phase difference between the two carrier signals (a) arriving at the two transceivers 210, 220 (e.g. two antennas). Additionally or alternatively, the wavelength of the carrier signal (A) can be calculated using equation (2) based on the known frequency (f) of the carrier signal and the speed of light (c). A distance (d) is known based on the positions of the transceivers 210, 220.

The angle of arrival (θ) of the carrier signals from the transmitter 415 to each pair of transceivers 210, 215, 220 can be calculated using equation (6) via the control unit 230. Various angles of arrivals between the transceivers 210, 215, 220 and the transmitter 415 of the mobile UWB device 410 of the personal user device 400 can be calculated using the above method. The various angles of arrival can then be used to calculate the position angles A1, A2, A3 as shown in FIG. 3A. For example, the position angles A1, A2, A3 may be calculated by adding and/or subtracting one or more of the angles of arrival (and/or angles adjacent to the angles of arrival) of carrier signals relative to one or more of the transceivers 210, 215, 220. While one example of determining the angle of arrival of the carrier signals is described above, other methods of determining the angle of arrival as known in the art may be used.

As shown in FIG. 3A, since position angle A3 is greater than position angle A1 and position angle A2, then control unit 230 of the onboard UWB device 200 will use transceivers 210, 220 to calculate the proximity of the transmitter 415 relative to the body 10. However, the position angle A3 alone will not provide an indication from which side the transmitter 415 is located. Although the transmitter 415 is shown on one side of the onboard UWB device 200, it is possible that the same position angle A3 can be calculated with the transmitter 415 being located on the opposite side of the onboard UWB device 200. The onboard UWB device 200 is therefore also configured to use the time difference of arrival mechanism as shown in FIG. 3C to determine on which side the transmitter 415 is located.

Figure 3C:
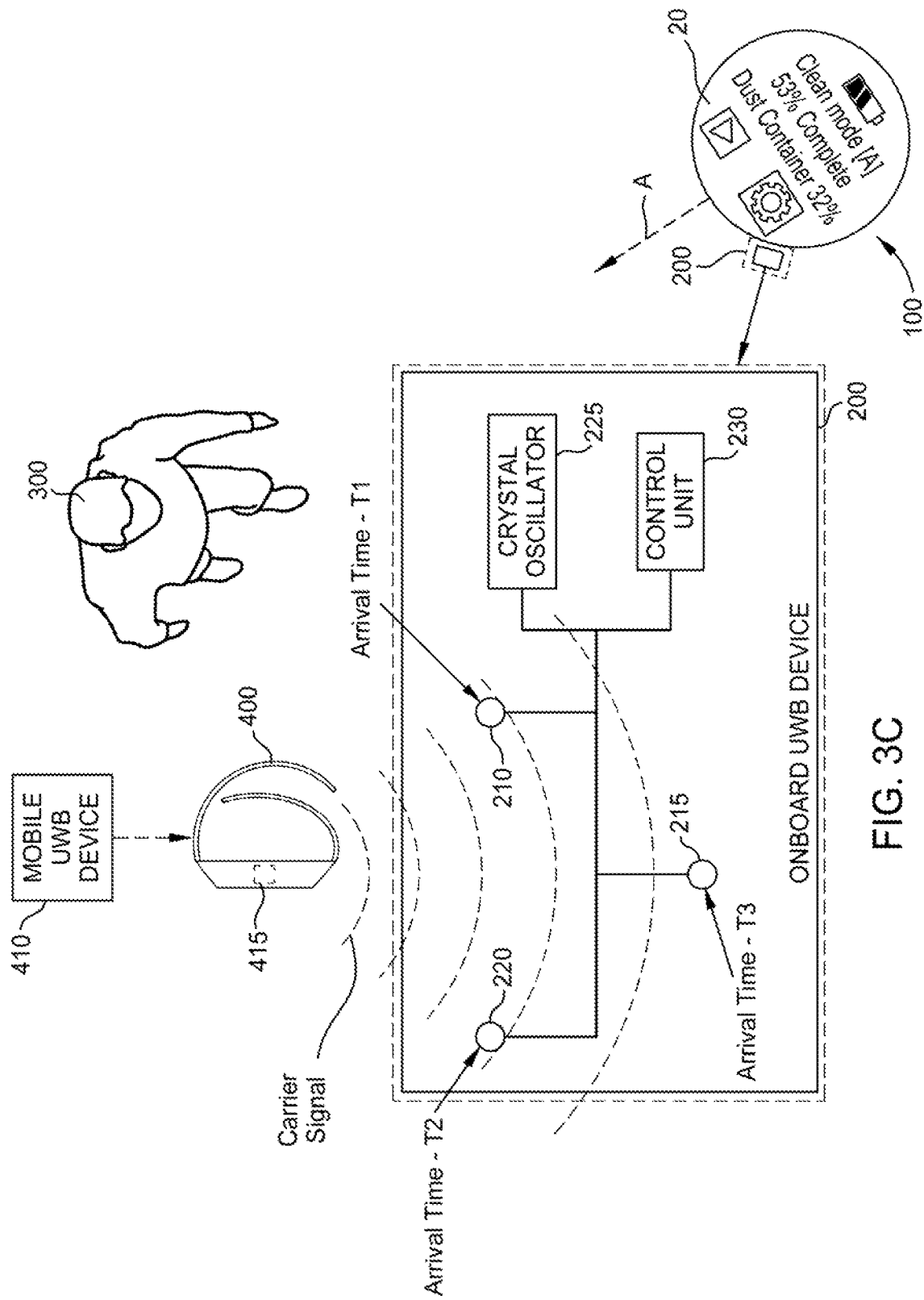
FIG. 3C is a schematic view of the personal user device communicating with the onboard ultra-wideband device of the autonomous mobile robot according to one embodiment.

The time difference of arrival mechanism is shown in FIG. 3C. The time difference of arrival mechanism is a method for determining the difference in the arrival time of one or more carrier signals (such as a radio frequency wave) from the transmitter 415 to each of the transceivers 210, 215, 220. The specific transceiver that first receives the signal is used to calculate which side the transmitter 415 is located on relative to the onboard UWB device 200.

Referring to FIG. 3C, the transmitter 415 of the mobile UWB device 410 on the personal user device 400 wirelessly communicates one or more carrier signals (such as a radio frequency wave) with the transceivers 210, 215, 220 of the onboard UWB device 200. Presumably the user 300 is wearing or is otherwise in possession of the personal user device 400 and therefore the position of the user 300 is being identified. Specifically, the control unit 230 and the crystal oscillator 225 of the onboard UWB device 200 continuously calculate the position of the transmitter 415 based on the difference in arrival time that each transceiver 210, 215, 220 detects the carrier signal from the transmitter 415.

The crystal oscillator is an electronic oscillator circuit that uses the mechanical resonance of a vibrating crystal of piezoelectric material to create an electrical signal. The electric signal has a frequency that is used to keep track of time to provide a stable clock signal. The transceivers 210, 215, 220 share the same crystal oscillator 225 so that they each have the exact same stable clock signal. In this manner, the transceivers 210, 215, 220 can be used to determine from which side the transmitter 415 is located by calculating the time difference of arrival based on the arrival time of the signal from the transmitter 415 as detected by each one transceiver 210, 215, 220 relative to each one other transceiver 210, 215, 220.

As shown in FIG. 3C, based on the location of the transmitter 415 relative to the transceivers 210, 215, 220, the signal from the transmitter 415 has an arrival time T1 as detected by the transceiver 210, an arrival time T2 as detected by the transceiver 220, and an arrival time T3 as detected by the transceiver 215. Based on the arrival times T1, T2, T3 as detected by the transceivers 210, 215, 220 and the crystal oscillator 225 and calculated by the control unit 230, the control unit 230 is then configured to determine which side the transmitter 415 is located relative to the onboard UWB device 200.

Based on the proximity of the transmitter 415 as continuously calculated by the onboard UWB device 200 using the angle of arrival mechanism, and based on the location of the transmitter 415 (e.g. which side the transmitter 415 is located on relative to the body 10 of the autonomous mobile robot 100) as continuously calculated by the onboard UWB device 200 using the time difference of arrival mechanism, the autonomous mobile robot 100 is configured to determine the position of the body 10 relative to the user 300. The autonomous mobile robot 100 can continuously maintain the body 10 moving in a given direction relative to the user 300, as well as adjust the orientation of the display screen 20 to face the user 300, as long as the user 300 wears or is in possession of the personal user device 400 which contains the mobile UWB device 410. The UWB based target tracking system of the autonomous mobile robot 100 helps to keep the autonomous mobile robot 100 moving in a given direction relative to the user 300 and the display screen 20 oriented toward the user 300 regardless of any changes in the surrounding environment's lighting conditions.

Autonomous Mobile Robot Using Proximity Sensor Based System

Figure 4A:
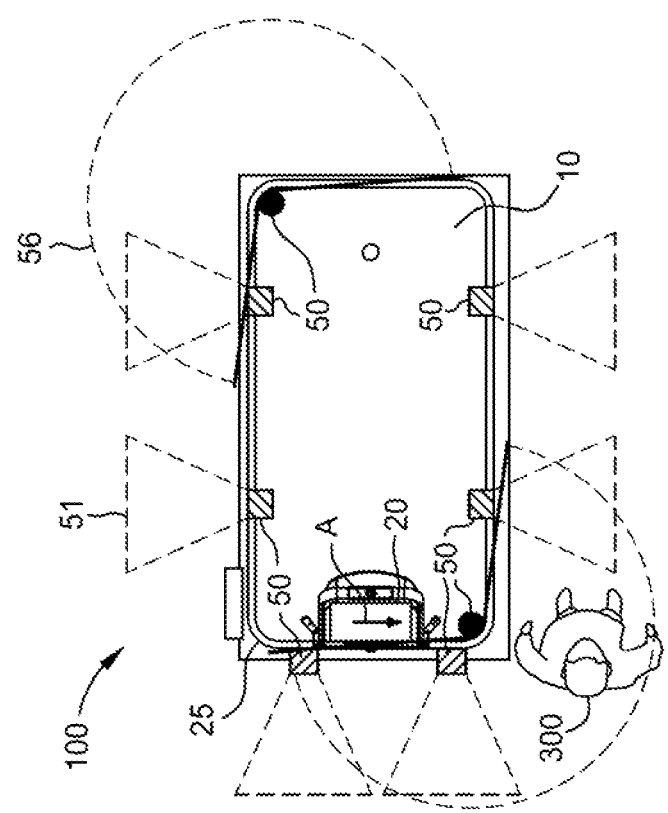
FIG. 4A is a schematic view of an autonomous mobile robot having a display screen oriented in a first position relative to a user according to one embodiment.
Figure 4B:
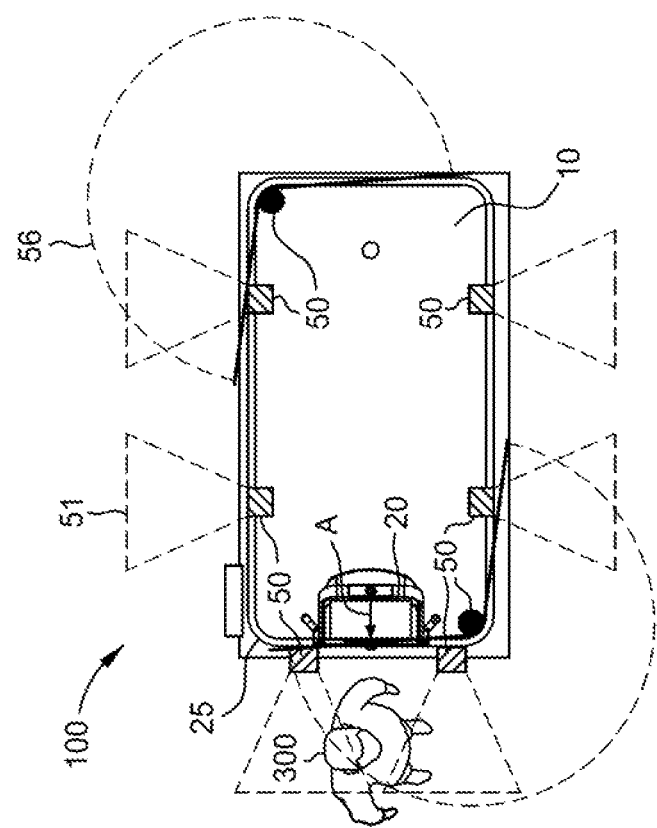
FIG. 4B is a schematic view of the autonomous mobile robot having the display screen oriented in a second position relative to the user according to one embodiment.

FIGS. 4A and 4B are schematic views of an autonomous mobile robot 100 relative to a user 300 according to one embodiment. The autonomous mobile robot 100 includes a body 10, a display screen 20, a front end 25, and a plurality of proximity sensors 50. The body 10 of the autonomous mobile robot 100 has a rectangular shape. The display screen 20 is disposed on top of the body 10 and at the front end 25 of the body 10. The plurality of proximity sensors 50 are coupled to the body 10 as shown.

A pair of proximity sensors 50 are positioned on each side of the body 10, and a pair of proximity sensors 50 are positioned on the front end 25 of the body 10 adjacent to the display screen 20. The proximity sensors 50 may be sonar sensors having a detection range 51. When the user 300 is within the detection range 51 of any one or more of the proximity sensors 50, the orientation of the display screen 20 is adjusted if necessary so that the viewing direction of the display screen 20 is facing in the direction of the user 300. Specifically, the viewing direction, identified by reference arrow A, is in line with the sight of the user 300.

A pair of proximity sensors 50 are positioned on opposite sides of the body 10 and on opposite ends of the body 10. The proximity sensors 50 may be LiDAR sensors having a detection range 56. When the user 300 is within the detection range 56 of any one of the proximity sensors 50, the orientation of the display screen 20 is adjusted if necessary so that the viewing direction of the display screen 20 is facing in the direction of the user 300. Specifically, the viewing direction, identified by reference arrow A, is in line with the sight of the user 300.

Referring to FIGS. 4A and 4B, as the user 300 moves from the front end of the autonomous mobile robot 100 to the side of the autonomous mobile robot 100, the orientation of the display screen 20 changes so that the display screen 20 is always facing the user 300. In FIG. 4A, the display screen 20 is oriented in a first position relative to the user 300. In FIG. 4B, the display screen 20 is oriented in a second position relative to the user 300. The second position is oriented at an angle relative to the first position. The second position may be oriented at a 90 degree angle relative to the first position.

Autonomous Mobile Robot Using Infrared Sensor Based System

Figure 5:
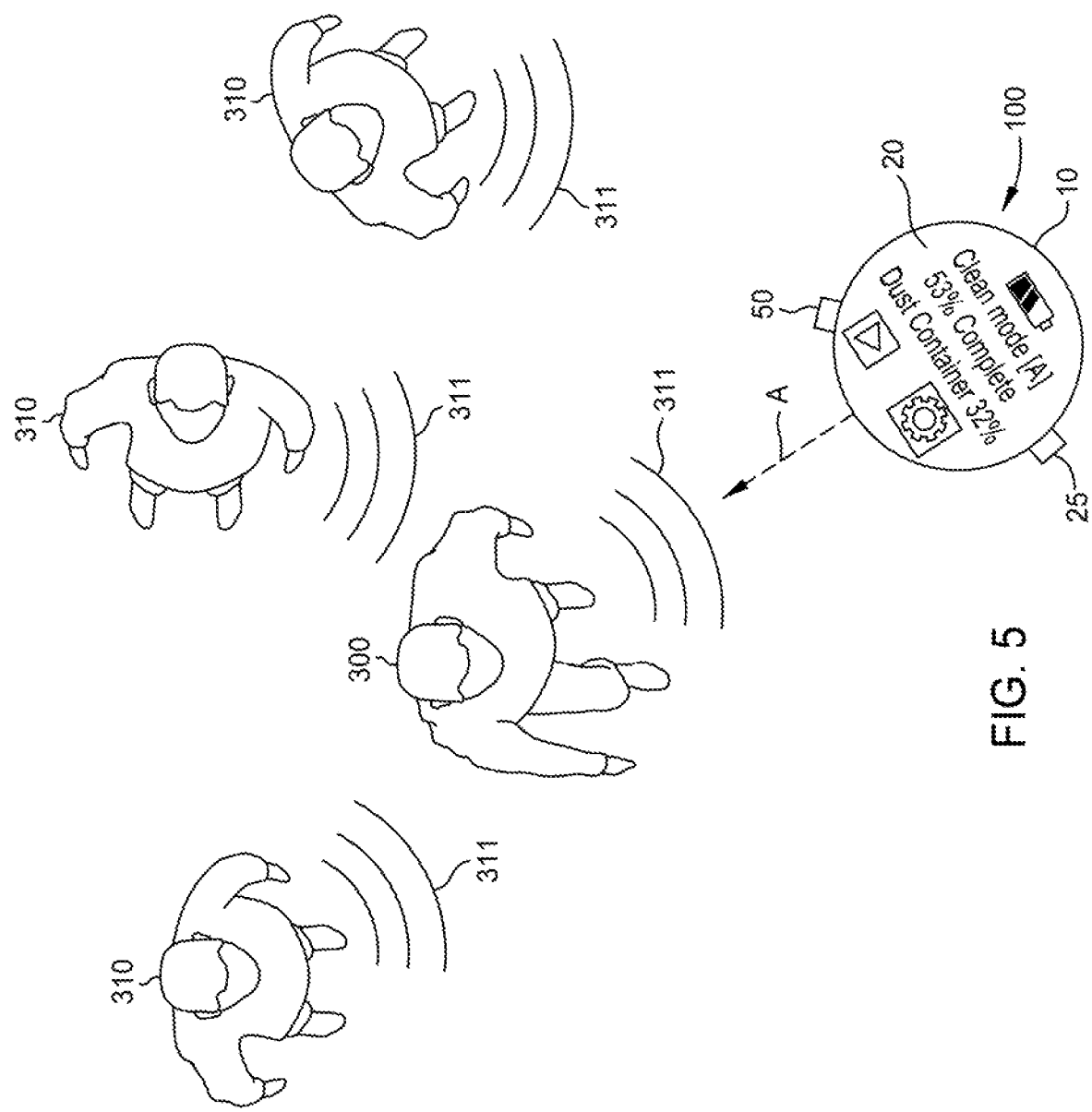
FIG. 5 is a schematic view of an autonomous mobile robot identifying a user according to one embodiment.

FIG. 5 is a schematic view of an autonomous mobile robot 100 moving in a given direction relative to a user 300 according to one embodiment. The autonomous mobile robot 100 includes a body 10, a display screen 20, a front end 25, and one or more infrared sensors 50. The infrared sensors 50 are coupled to the body 10. The infrared sensors 50 are configured to detect thermal radiation 311 emitted by nearby targets, such as the user 300 and other nearby people 310. Based on the thermal radiation 311 emitted by the nearby targets and detected by the infrared sensors 50, the autonomous mobile robot 100 is configured to determine the closest target, and then orient the display screen 20 in the direction of the target closest to the autonomous mobile robot 100.

Examples of Autonomous Mobile Robot Systems

Figure 6:
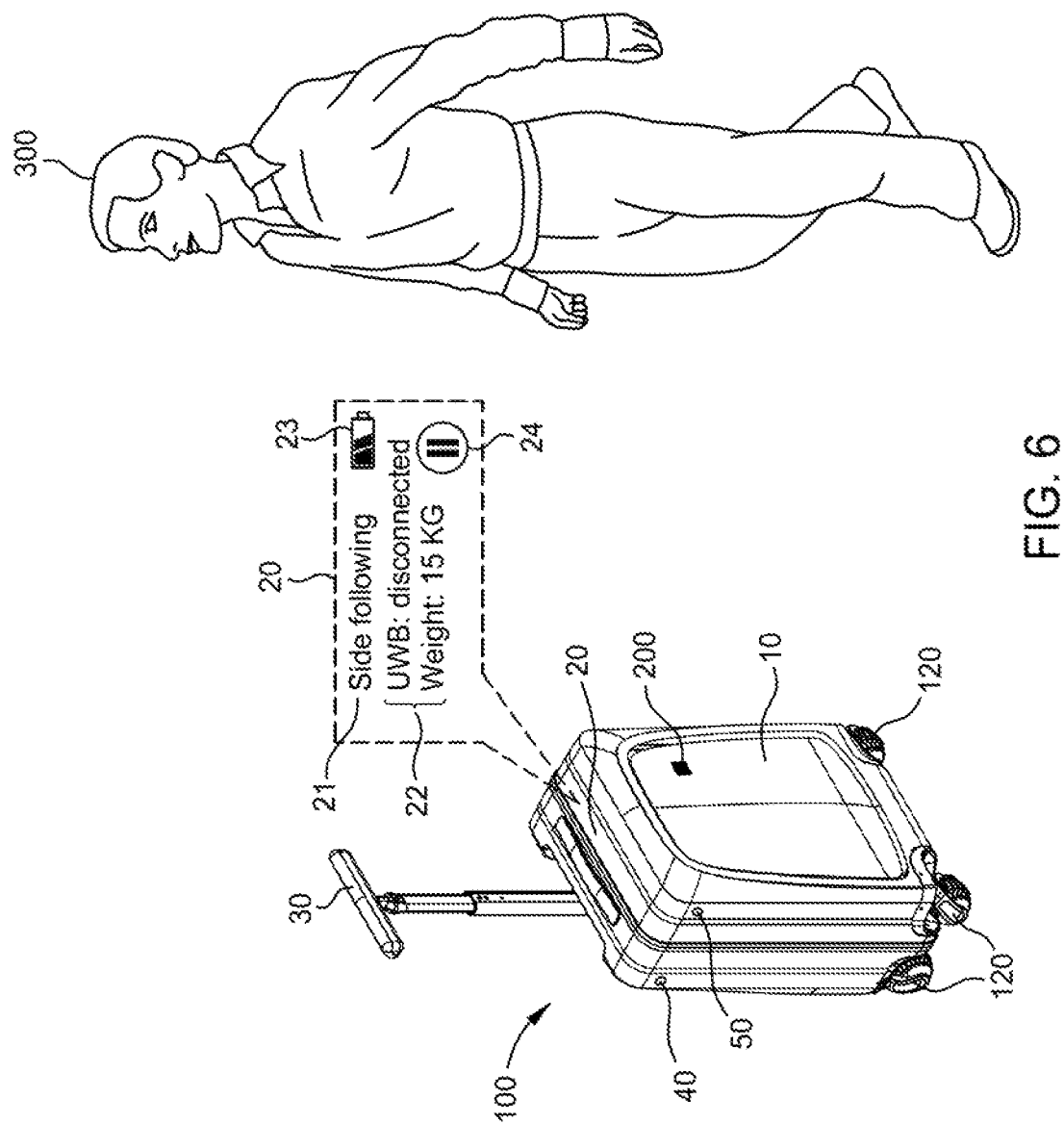
FIG. 6 is a schematic view of an autonomous mobile robot in the form of a luggage according to one embodiment.

FIG. 6 is a schematic view of an autonomous mobile robot 100 in the form of a piece of luggage according to one embodiment. The embodiments of the camera based system, the UWB based system, the proximity sensor based system, the infrared sensor based system, and/or combinations thereof as described herein may be used with the luggage so that the orientation of the display screen of the luggage adjusts relative to the sight of the user 300. The luggage has a body 10 that can be used to store items for transport. The luggage is configured to autonomously follow a user 300 in a rear following position behind the user 300, and/or in a side following positon on a right side or a left side of the user 300.

The luggage includes a handle 30 coupled to the body 10. The handle 30 is configured to allow the user 300 to push, pull, and/or lift the luggage. The luggage further includes four wheel assemblies 120 coupled to a bottom of the body 10. Each wheel assembly 120 is configured to rotate in a given direction and roll in the given direction. Each wheel assembly 120 is motorized to move the luggage in a given direction. In one embodiment, the luggage is supported by two, three, or more wheel assemblies 120. In one embodiment, a plurality (e.g. two, three, or more) of the wheel assemblies 120 are motorized to move the luggage in a given direction. In one embodiment, the wheel assemblies 20 are caster-type wheels.

The luggage may include one or more cameras 40, one or more onboard UWB devices 200, and/or one or more sensors 50 coupled to the body 10 and/or the handle 30. Any number of cameras 40, onboard UWB devices 200, and/or sensors 50 can be used and located at different positions and/or on any side of the body 10 and/or the handle 30.

The luggage further includes a display screen 20 disposed on top of the body 10. The viewing direction of the display screen 20 is adjustable based on the position of the user 300 relative to the luggage. The display screen 20 may display information, such as a mode of operation 21 (e.g. rear following or side following mode), a status of operation 22 (e.g. UWB disconnected and/or weight of items stored in the luggage), a battery indicator 23 (e.g. a percent of battery power remaining), and/or one or more buttons for operation 24 (e.g. a start/pause/stop button).

FIG. 7 is a schematic view of an autonomous mobile robot 100 in the form of a vacuum cleaner or a lawn mower according to one embodiment. The embodiments of the camera based system, the UWB based system, the proximity sensor based system, the infrared sensor based system, and/or combinations thereof as described herein may be used with the vacuum cleaner or the lawn mower so that the orientation of the display screen of the vacuum cleaner or the lawn mower adjusts relative to the sight of the user 300. The vacuum cleaner or the lawn mower has a body 10. The vacuum cleaner or the lawn mower is configured to autonomously clean floors or cut lawns based on preprogrammed instructions.

The vacuum cleaner or the lawn mower includes a handle 30 coupled to the body 10. The handle 30 is configured to allow the user 300 to push, pull, and/or lift the vacuum cleaner or the lawn mower. The vacuum cleaner or the lawn mower further includes four wheel assemblies 120 coupled to a bottom of the body 10. Each wheel assembly 120 is motorized to move the vacuum cleaner or the lawn mower in a given direction. In one embodiment, the vacuum cleaner or the lawn mower is supported by two, three, or more wheel assemblies 120. In one embodiment, a plurality (e.g. two, three, or more) of the wheel assemblies 120 are motorized to move the vacuum cleaner or the lawn mower in a given direction.

The vacuum cleaner or the lawn mower may include one or more cameras 40, one or more onboard UWB devices 200, and/or one or more sensors 50 coupled to the body 10 and/or the handle 30. Any number of cameras 40, onboard UWB devices 200, and/or sensors 50 can be used and located at different positions and/or on any side of the body 10 and/or the handle 30.

The vacuum cleaner or the lawn mower further includes a display screen 20 disposed on top of the body 10. The viewing direction of the display screen 20 is adjustable based on the position of the user 300 relative to the vacuum cleaner or the lawn mower. The display screen 20 may display information, such as a mode of operation 21 (e.g. emergency stop), a status of operation 22 (e.g. person/pet detected), a battery indicator 23 (e.g. a percent of battery power remaining), and/or one or more buttons for operation 24 (e.g. a start/pause/stop button).

Figure 8:
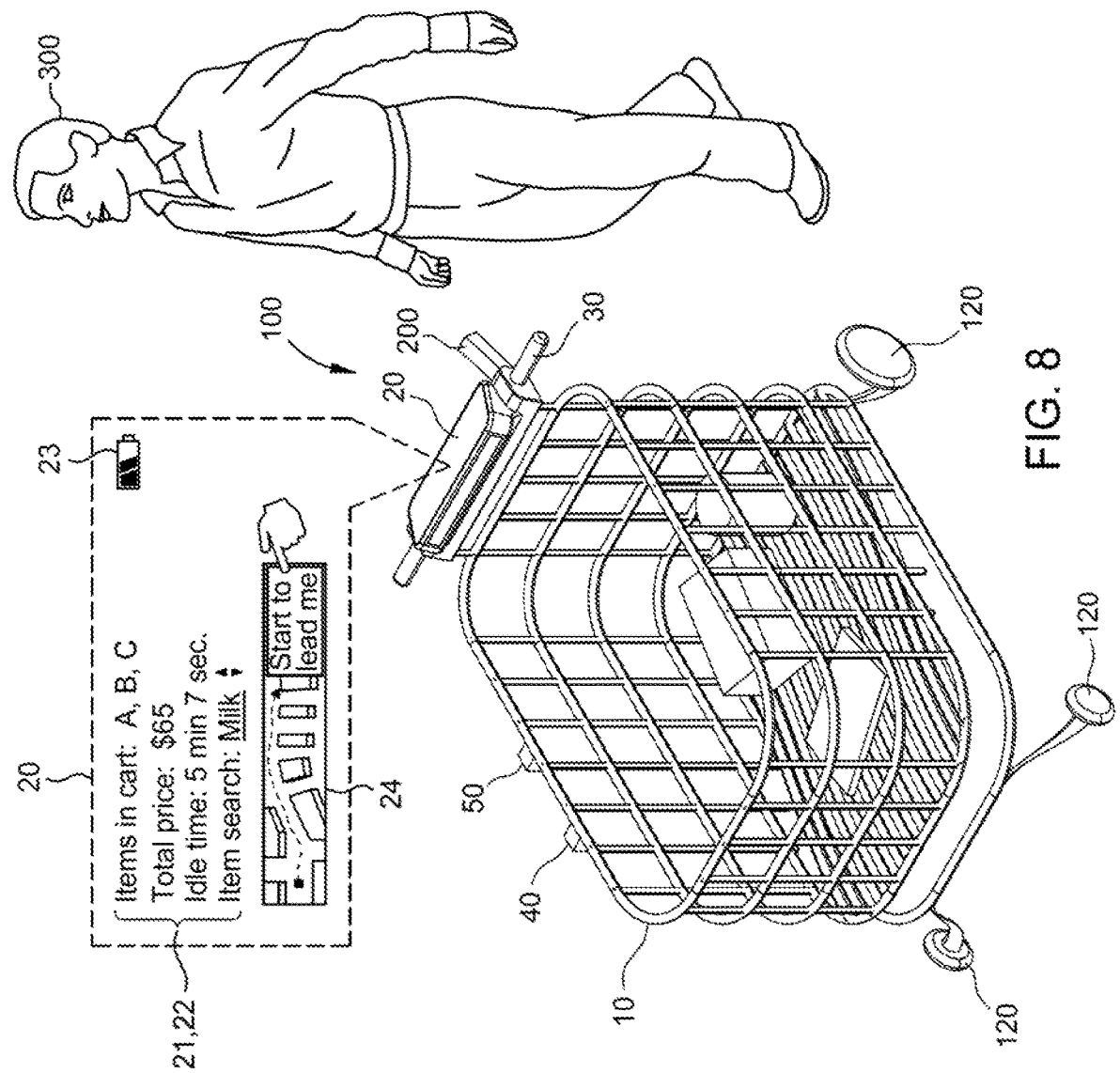
FIG. 8 is a schematic view of an autonomous mobile robot in the form of a shopping cart according to one embodiment.

FIG. 8 is a schematic view of an autonomous mobile robot 100 in the form of a shopping cart according to one embodiment. The embodiments of the camera based system, the UWB based system, the proximity sensor based system, the infrared sensor based system, and/or combinations thereof as described herein may be used with the shopping cart so that the orientation of the display screen of the shopping cart adjusts relative to the sight of the user 300. The shopping cart has a body 10 that can be used to store items for transport. The shopping cart is configured to autonomously follow a user 300 in a rear following position behind the user 300, and/or in a side following positon on a right side or a left side of the user 300. The shopping cart is configured to autonomously lead the user 300 in a given direction to a specific location.

The shopping cart includes a handle 30 coupled to the body 10. The handle 30 is configured to allow the user 300 to push, pull, and/or lift the shopping cart. The shopping cart further includes four wheel assemblies 120 coupled to a bottom of the body 10. Each wheel assembly 120 is motorized to move the shopping cart in a given direction. In one embodiment, the shopping cart is supported by two, three, or more wheel assemblies 120. In one embodiment, a plurality (e.g. two, three, or more) of the wheel assemblies 120 are motorized to move the shopping cart in a given direction.

The shopping cart may include one or more cameras 40, one or more onboard UWB devices 200, and/or one or more sensors 50 coupled to the body 10 and/or the handle 30. Any number of cameras 40, onboard UWB devices 200, and/or sensors 50 can be used and located at different positions and/or on any side of the body 10 and/or the handle 30.

The shopping cart further includes a display screen 20 disposed on top of the handle 30. The viewing direction of the display screen 20 is adjustable based on the position of the user 300 relative to the shopping cart. The display screen 20 may display information, such as a mode of operation 21 (e.g. rear following, side following, or leading mode), a status of operation 22 (e.g. items stored in the shopping cart, price of items, idle time, item search, etc.), a battery indicator 23 (e.g. a percent of battery power remaining), and/or one or more buttons for operation 24 (e.g. a start/pause/stop button and/or a "start to lead me" button).

Figure 9:
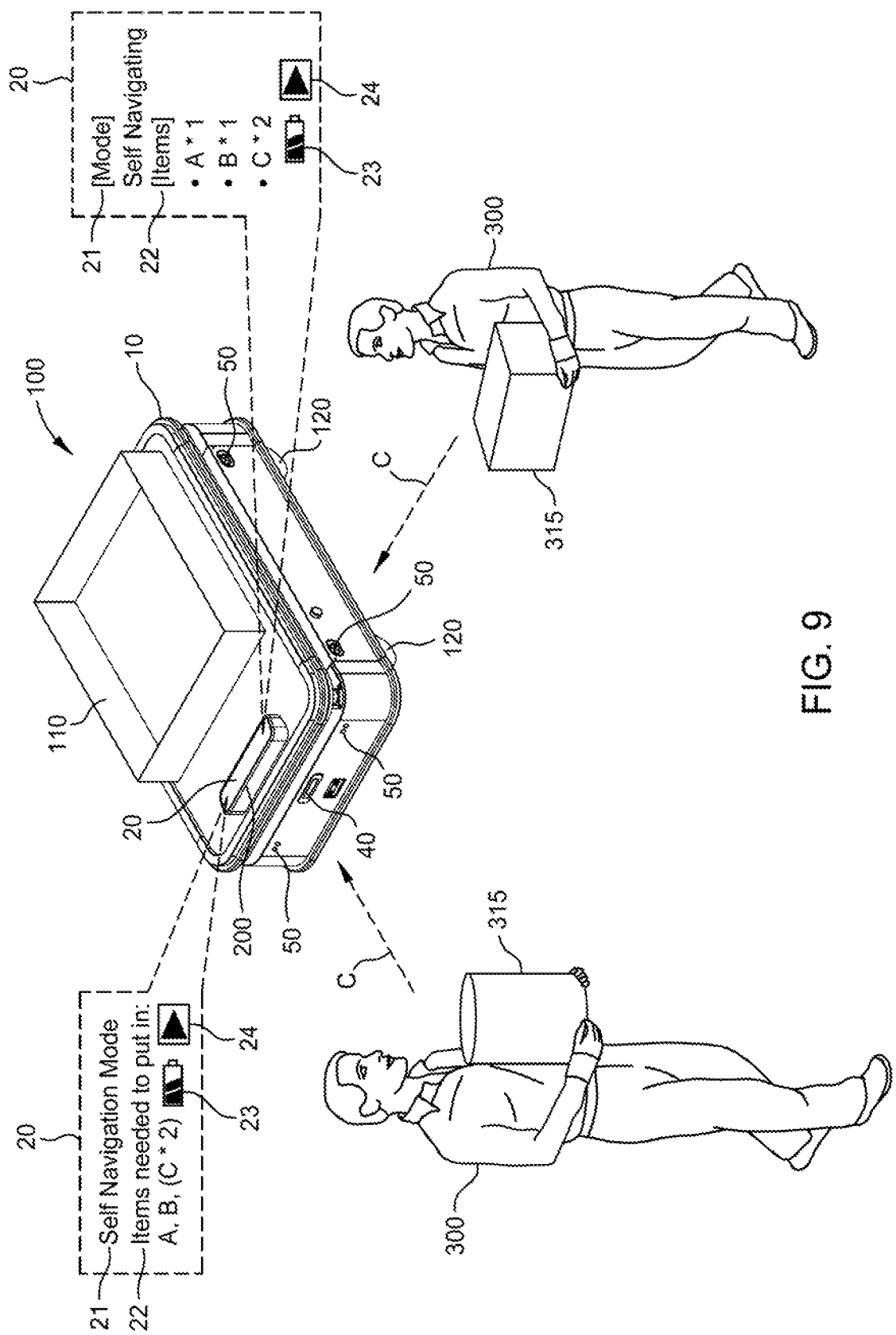
FIG. 9 is a schematic view of an autonomous mobile robot in the form of a logistics mobile robot according to one embodiment.

FIG. 9 is a schematic view of an autonomous mobile robot 100 in the form of a logistics mobile robot according to one embodiment. The embodiments of the camera based system, the UWB based system, the proximity sensor based system, the infrared sensor based system, and/or combinations thereof as described herein may be used with the logistics mobile robot so that the orientation of the display screen 20 of the logistics mobile robot adjusts relative to the sight of the user 300, which is identified by reference arrow C. The logistics mobile robot may include one or more wheel assemblies 120 coupled to a bottom of the body 10. Each wheel assembly 120 is motorized to move the logistics mobile robot in a given direction. In one embodiment, the logistics mobile robot is supported by two, three, or more wheel assemblies 120. In one embodiment, a plurality (e.g. two, three, or more) of the wheel assemblies 120 are motorized to move the logistics mobile robot in a given direction.

The logistics mobile robot may include one or more cameras 40, one or more onboard UWB devices 200, and/or one or more sensors 50 coupled to the body 10. Any number of cameras 40, onboard UWB devices 200, and/or sensors 50 can be used and located at different positions and/or on any side of the body 10. The logistics mobile robot includes a container 110 disposed on top of the body 10. One or more items 315 may be contained in the container 110 for transport by the logistics mobile robot. The display screen 20 may display information, such as a mode of operation 21 (e.g. a self-navigation mode), a status of operation 22 (e.g. an amount and quantity of items located in the container 110), a battery indicator 23 (e.g. a percent of battery power remaining), and/or one or more buttons for operation 24 (e.g. a start/pause/stop button).

Figure 10B:
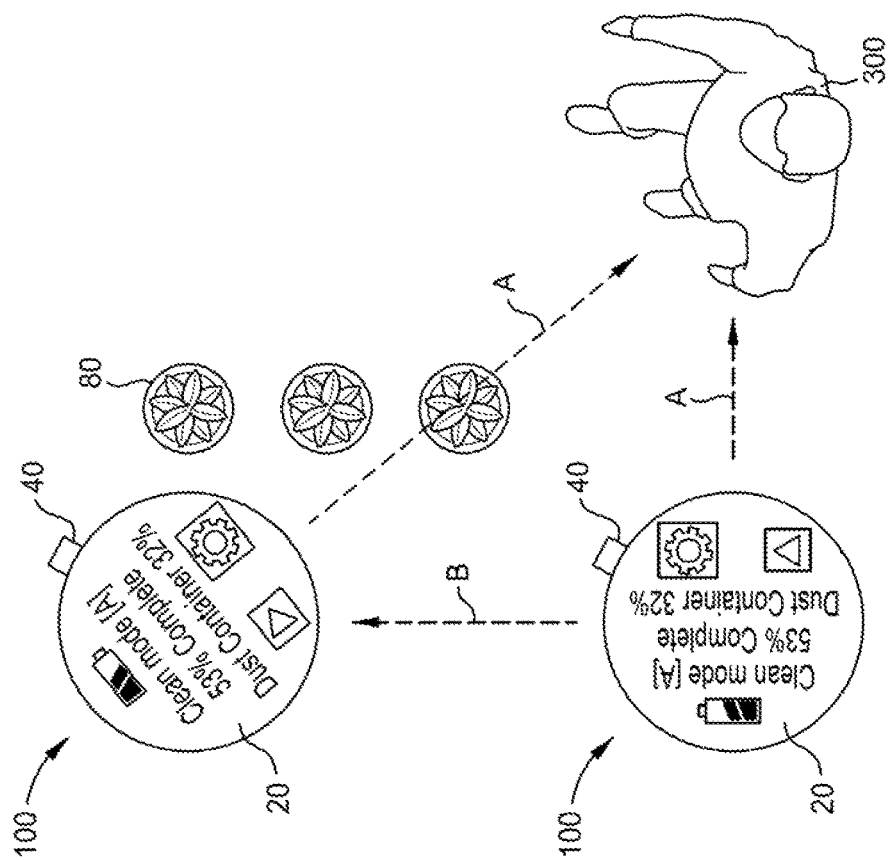
FIG. 10B is a schematic view of the autonomous mobile robot moving in the given direction relative to the user according to one embodiment.
Figure 10A:
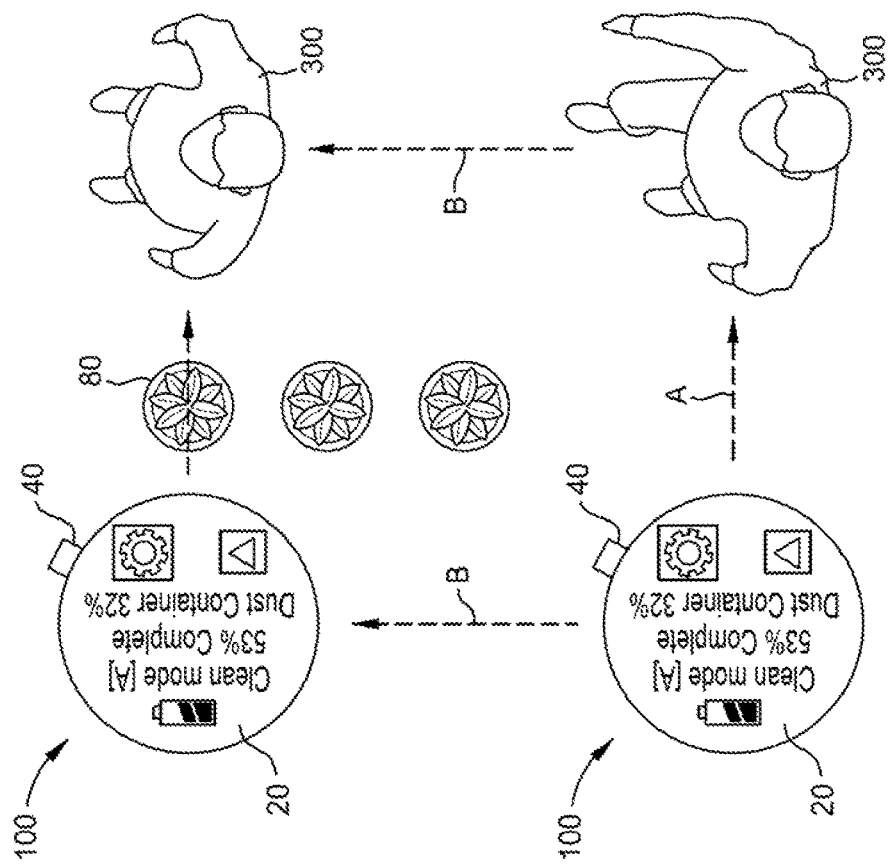
FIG. 10A is a schematic view of an autonomous mobile robot moving in a given direction relative to a user according to one embodiment.

FIG. 10A is a schematic view of an autonomous mobile robot 100 moving in a given direction relative to a user 300 according to one embodiment. As the autonomous mobile robot 100 and the user 300 both move in a given direction, identified by reference arrows B, the orientation of the display screen 20 is maintained in the viewing direction, identified by reference arrows A, facing toward the user 300. The autonomous mobile robot 100 is configured to record the speed of the user 300 via one or more cameras 40 while moving in the given direction. If an obstruction 80 blocks the cameras 40 of the autonomous mobile robot 100 from detecting the user 300, then the autonomous mobile robot 100 is configured to continue moving at the recorded speed of the user 300 and adjust (or maintain) the orientation of the display screen 20 in the viewing direction that the autonomous mobile robot 100 determines the user 300 will be based on the recorded speed of the user 300. Although identified as cameras 40, the autonomous mobile robot 100 may be equipped with cameras, sensors, onboard UWB devices, and/or combinations thereof to detect the user 300 as described herein.

FIG. 10B is a schematic view of the autonomous mobile robot 100 moving in the given direction relative to the user 300 according to one embodiment. As the autonomous mobile robot 100 moves in a given direction, identified by reference arrows B, the orientation of the display screen 20 is maintained in the viewing direction, identified by reference arrows A, facing toward the user 300 who remains stationary. The autonomous mobile robot 100 is configured to record the stationary position of the user 300 via one or more cameras 40 while the autonomous mobile robot 100 moves in the given direction. If an obstruction 80 blocks the cameras 40 of the autonomous mobile robot 100 from detecting the user 300, then the autonomous mobile robot 100 is configured to continue moving in the given direction and adjust (or maintain) the orientation of the display screen 20 in the viewing direction towards the stationary position that the autonomous mobile robot 100 determines the user 300 is located. Although identified as cameras 40, the autonomous mobile robot 100 may be equipped with cameras, sensors, onboard UWB devices, and/or combinations thereof to detect the user 300 as described herein.

Figure 11:
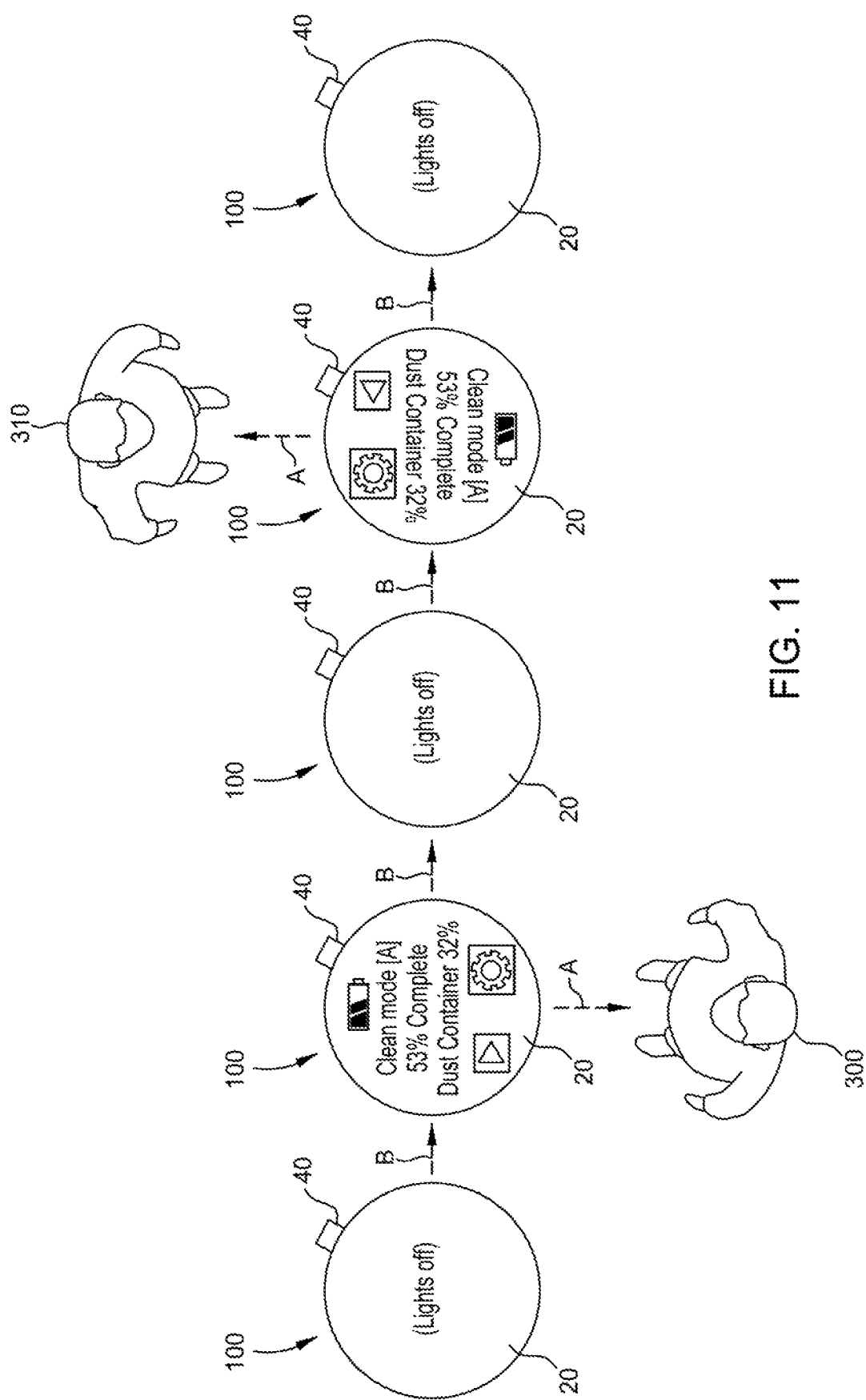
FIG. 11 is a schematic view of an autonomous mobile robot moving in a given direction relative to a user according to one embodiment.

FIG. 11 is a schematic view of an autonomous mobile robot 100 moving in a given direction relative to a user 300 and another person 310 according to one embodiment. As the autonomous mobile robot 100 moves in a given direction, identified by reference arrows B, the light of the display screen 20 is either turned on or off depending on the proximity of the autonomous mobile robot 100 to the user 300 and/or another person 310. When the user 300 and/or another person 310 is within a detection range of the one or more cameras 40 of the autonomous mobile robot 100, the display screen 20 is turned on and oriented in the direction of the closest person, identified by reference arrows A. When nobody is within the detection range of the one or more cameras 40 of the autonomous mobile robot 100, the display screen 20 is turned off to save energy and extend battery life. Although identified as cameras 40, the autonomous mobile robot 100 may be equipped with cameras, sensors, onboard UWB devices, and/or combinations thereof to detect the user 300 as described herein.

Figure 12:
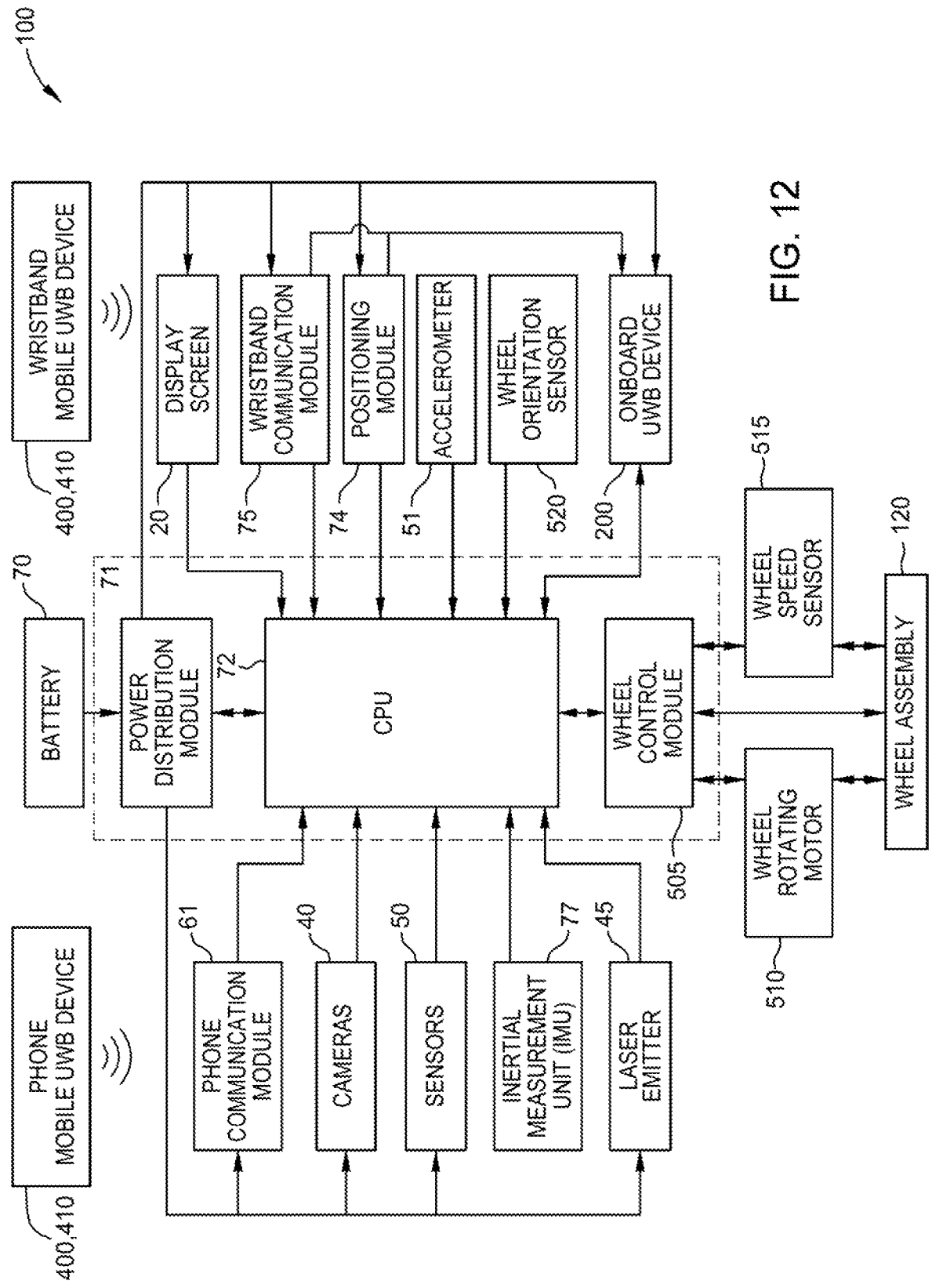
FIG. 12 is a block diagram of an autonomous mobile robot according to one embodiment.

FIG. 12 is a block diagram of an autonomous mobile robot 100, which may include any of the autonomous mobile robots described herein, according to one embodiment. The autonomous mobile robot 100 includes a battery 70 in communication with a power distribution module 71. The power distribution module 71 is configured to distribute power supplied by the battery 70 to the other components of the autonomous mobile robot 100.

The autonomous mobile robot 100 includes a central processing unit ("CPU") 72 in communication with the display screen 20. The CPU 72 is configured to adjust the orientation of the display screen 20 relative to the user 300 based on the information received from one or more cameras 40, one or more sensors 50, and/or one or more onboard UWB devices 200 as described herein. The CPU 72 is configured to identify the user 300 and/or the person closest to the autonomous mobile robot 100 based on the information received from the one or more cameras 40, one or more sensors 50, and/or one or more onboard UWB devices 200 as described herein. The information received from the one or more cameras 40, one or more sensors 50, and/or one or more onboard UWB devices 200 may include information regarding speed, proximity (e.g. position and/or location), facial features, and/or appearance of the user 300 and/or other nearby targets (e.g. other nearby people or obstructions). The CPU 72 orients the display screen 20 toward the user 300 such that a viewing direction of the display screen 20 is directed toward (e.g. faces) the user 300 at all times, regardless of the position of the autonomous mobile robot 100 relative to the user 300, and regardless of whether the autonomous mobile robot 100 and/or the user 300 is moving in a given direction.

The CPU 72 is also in communication with a phone communication module 61 and a wristband communication module 75. A cellular phone 400 with the mobile UWB device 410 and a wristband 400 with the mobile UWB device 410 are used to communicate with the phone communication module 61 and the wristband communication module 75, respectively, via ultra-wideband, radio frequency identification (active and/or passive), Bluetooth (low energy), WiFi, and/or any other form of communication known in the art. The cellular phone 400 with the mobile UWB device 410 and/or the wristband 400 with the mobile UWB device 410 are configured to allow the user to send a signal (such as instructions and/or a radio frequency wave) to the CPU 72 to control operation of the autonomous mobile robot 100, and to receive information from the CPU 72 regarding the operation of the autonomous mobile robot 100. The cellular phone 400 with the mobile UWB device 410 and/or the wristband 400 with the mobile UWB device 410 are also configured to allow the user to send a signal (such as instructions and/or a radio frequency wave) to the onboard UWB device 200 directly or through the CPU 72 to control operation of the autonomous mobile robot 100, and to receive information from the with the onboard UWB device 200 directly or through the CPU 72 regarding the operation of the autonomous mobile robot 100. The wristband communication module 75 may be a separate unit or integrated into the UWB device 200.

The CPU 72 is configured to receive information (such as the position of the user moving in a given direction) from the onboard UWB device 200, and in response instruct the wheel control system to move the body 10 in the given direction. In one embodiment, the onboard UWB device 200 is configured to instruct a wheel control system to move the body 10 in the given direction. The wheel control system may include a wheel control module 505, a wheel rotating motor 510, a wheel speed sensor 515, a wheel orientation sensor 520, and/or one or more wheel assemblies 120. In one embodiment, the CPU 72 is a separate processing unit than the control unit 230 of the onboard UWB device 200. In one embodiment, the CPU 72 and the control unit 230 are integrated into a single processing unit mounted on the onboard UWB device 200 or on the body 10 at a different location. In one embodiment, the power distribution module 71, the CPU 72, and the wheel control module 505 are integrated into a single processing unit coupled to the body 10.

A positioning module 74 is configured to communicate information regarding the position of the body 10 to the CPU 72, the onboard UWB device 200, and/or the user (via the cellular phone 400 and/or the wristband 400 for example). The positioning module 74 may be a separate unit or integrated into the UWB device 200. The positioning module 74 may include GPS (outdoor), WiFi access points (indoor), and/or Bluetooth beacons (indoor) so that the user can find the location of the autonomous mobile robot 100 at any time, such as in the event that the autonomous mobile robot 100 is lost. An accelerometer 51 is configured to communicate information regarding the overall acceleration and/or speed of the autonomous mobile robot 100 to the CPU 72. A wheel orientation sensor 520 is configured to communicate information regarding the orientation of the motorized wheel assemblies 120 to the CPU 72.

The CPU 72 is also in communication with the cameras 40, the sensors 50, an inertial measurement unit ("IMU") 77, and the wheel control module 505. The cameras 40 are configured to communicate information regarding the visual images and presence of nearby targets that the cameras 40 record and/or detect to the CPU 72. The sensors 50 are configured to communicate information regarding the presence of targets near the autonomous mobile robot 100 to the CPU 72. The IMU 77 is configured to communicate information regarding the dynamic movements of the autonomous mobile robot 100, such as the pitch, roll, yaw, acceleration, and/or angular rate of the autonomous mobile robot 100 to the CPU 72. For example, once the IMU 77 detects that the autonomous mobile robot 100 is titling or falling over, then the CPU 72 will instruct a wheel control module 505 to stop one or more wheel rotating motors 510 from rotating one or more of the wheel assemblies 120.

The wheel control module 505 is in communication with a wheel speed sensor 515 and the wheel rotating motor 510. The wheel control module 505 is configured to communicate information regarding the motorized wheel assemblies 120, such as the rotary speed measured by the wheel speed sensor 515, to the CPU 72. Although only one wheel control module 505 is shown, each wheel assembly 120 can include a separate wheel control module 505 in communication with the CPU 72. In one embodiment, the wheel control module 505 can be integrated into the CPU 72 as a single processing unit. According to one example, the CPU 72 includes a single wheel control module 505 to control all four wheel assemblies 20. According to one example, the CPU 72 includes four wheel control modules 505, one for each wheel assembly 120.

The CPU 72 is configured to analyze the information received from the various components (e.g. cameras 40, sensors 50, modules 61, 74, 75, 505, onboard UWB device 200, display screen 20, etc.) of the autonomous mobile robot 100 and perform the computational functions programmed into the CPU 72 based on the information to operate the autonomous mobile robot 100 as described herein. For example, the CPU 72 is configured to determine a given direction and speed based on the information (such as the position of the user as calculated by the onboard UWB device 200). In response, the CPU 72 is configured to control the direction and speed of the autonomous mobile robot 100 relative to the user and/or the surrounding environment. Specifically, the CPU 72 is configured to control the direction and the speed of the autonomous mobile robot 100 through the wheel control module 505 by instructing the wheel control module 505 to increase, decrease, or stop power, e.g. input current, supplied to each respective motorized wheel assembly 120.

While the foregoing is directed to embodiments of the disclosure, other and further embodiments of the disclosure thus may be devised without departing from the basic scope thereof, and the scope thereof is determined by the claims that follow.

The invention claimed is:

1. An autonomous mobile robot, comprising:
   a body;
   a display screen coupled to the body and configured to display information;
   a wheel control system coupled to the body and configured to move the body in a given direction;
   at least one of a camera, an onboard ultra-wideband (UWB) device, or a sensor coupled to the body, the onboard UWB device being configured to receive one or more signals from a mobile UWB device carried by a user; and
   a central processing unit in communication with the wheel control system, the display screen, and the at least one camera, onboard UWB device, or sensor,
   wherein the central processing unit is configured to adjust the orientation of the display screen relative to the user based on information received from the at least one camera, onboard UWB device, or sensor, and
   wherein the central processing unit is configured to continuously orient the viewing direction of the display screen towards the user in response to at least information regarding a position of the user from the onboard UWB device.

2. The robot of claim 1, wherein the central processing unit is configured to receive a photograph or video from the camera, and in response, identify the user from the photograph or video based on a face or an appearance of the user.

3. The system of claim 1, wherein a control module of the onboard UWB device is configured to determine an angle of arrival of a signal as received by three transceivers to determine a position angle of the user relative to two of the three transceivers, and then determine the proximity of the user relative to the body based on the two transceivers having the largest position angle.

4. The system of claim 3, wherein the control module of the onboard UWB device is configured to determine a time difference of arrival of a signal as received by the three transceivers, and then determine a side on which the user is located relative to the body based on the transceiver that first received the signal.

5. The system of claim 4, wherein each transceiver is coupled to a crystal oscillator and have the same clock signal to determine the time difference of arrival of the signal as received by the three transceivers.

6. The robot of claim 1, wherein the sensor is a proximity sensor, and wherein the central processing unit is configured to receive information regarding a proximity of the user from the proximity sensor, and in response, orient the viewing direction of the display screen towards the user.

7. The robot of claim 6, wherein the proximity sensor is a sonar sensor or a LiDAR sensor.

8. The robot of claim 1, wherein the sensor is an infrared sensor configured to detect thermal radiation, and wherein the central processing unit is configured to receive information regarding a proximity of the user from the infrared sensor, and in response, orient the viewing direction of the display screen towards the user.

9. The robot of claim 1, wherein the body is in the form of a piece of luggage, a vacuum cleaner, a lawn mower, a shopping cart, or a logistic mobile robot.

10. The robot of claim 1, wherein the information displayed by the display screen includes a mode of operation, a status of operation, a battery indicator, or one or more buttons for operation.

11. The robot of claim 1, wherein the orientation of the display screen is adjustable from a first position to a second position that is oriented at an angle relative to the first position.

12. An autonomous mobile robot, comprising:
    a body;
    a display screen coupled to the body and configured to display information;
    an onboard ultra-wideband (UWB) device coupled to the body, the onboard UWB device being configured to receive one or more signals from a mobile UWB device carried by a user;
    a wheel control system coupled to the body and configured to move the body in a given direction; and
    a central processing unit in communication with the wheel control system and the display screen, wherein the central processing unit is configured to adjust the orientation of the display screen relative to the user based on a recorded speed of the user calculated from at least the onboard UWB device and the mobile UWB device when the autonomous mobile robot is obstructed from detecting the user.

13. The robot of claim 12, further comprising at least one camera or sensor configured to communicate information to the central processing unit regarding the speed of the user.

14. The robot of claim 12, wherein the body is in the form of a piece of luggage, a vacuum cleaner, a lawn mower, a shopping cart, or a logistic mobile robot.

15. The robot of claim 12, wherein the information displayed by the display screen includes a mode of operation, a status of operation, a battery indicator, or one or more buttons for operation.

16. An autonomous mobile robot, comprising:
a body;
a display screen coupled to the body and configured to display information;
an onboard ultra-wideband (UWB) device coupled to the body, the onboard UWB device being configured to receive one or more signals from a mobile UWB device carried by a user;
a wheel control system coupled to the body and configured to move the body in a given direction; and
a central processing unit in communication with the wheel control system and the display screen, wherein the central processing unit is configured to turn the display screen on or off, as well as adjust the orientation of the display screen when turned on, based on a proximity of the user relative to the body calculated from at least the onboard UWB device and the mobile UWB device.

17. The robot of claim 16, further comprising at least one camera or sensor configured to communicate information to the central processing unit regarding the proximity of the user.

18. The robot of claim 16, wherein the body is in the form of a piece of luggage, a vacuum cleaner, a lawn mower, a shopping cart, or a logistic mobile robot.

19. The robot of claim 16, wherein the information displayed by the display screen includes a mode of operation, a status of operation, a battery indicator, or one or more buttons for operation.

* * * * *